(12) United States Patent
Zhao et al.

(10) Patent No.: US 8,903,707 B2
(45) Date of Patent: Dec. 2, 2014

(54) PREDICTING PRONOUNS OF DROPPED PRONOUN STYLE LANGUAGES FOR NATURAL LANGUAGE TRANSLATION

(75) Inventors: Bing Zhao, Stamford, CT (US); Imed Zitouni, White Plains, NY (US); Xiaoqiang Luo, Ardsley, NY (US); Vittorio Castelli, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 13/348,995

(22) Filed: Jan. 12, 2012

(65) Prior Publication Data
US 2013/0185049 A1  Jul. 18, 2013

(51) Int. Cl.
*G06F 17/28* (2006.01)
(52) U.S. Cl.
USPC .......................... 704/2; 704/3; 704/4; 706/11
(58) Field of Classification Search
CPC ............................. G06F 17/28; G06F 17/2827
USPC .............. 704/2, 4, 8, 277, 3; 706/11
See application file for complete search history.

(56) References Cited

U.S. PATENT DOCUMENTS

| 6,125,342 | A * | 9/2000 | Selesky ............................. 704/9 |
| 6,219,646 | B1 * | 4/2001 | Cherny ......................... 704/277 |
| 7,454,326 | B2 | 11/2008 | Marcu et al. |
| 7,464,024 | B2 * | 12/2008 | Luo et al. .......................... 704/9 |
| 7,533,013 | B2 | 5/2009 | Marcu |
| 7,640,233 | B2 * | 12/2009 | Baartman et al. .................. 704/2 |
| 7,703,140 | B2 * | 4/2010 | Nath et al. ....................... 726/26 |
| 7,966,173 | B2 * | 6/2011 | Emam et al. ...................... 704/9 |
| 8,032,355 | B2 * | 10/2011 | Narayanan et al. ............... 704/2 |
| 8,660,836 | B2 * | 2/2014 | Castelli et al. .................... 704/8 |
| 8,725,496 | B2 * | 5/2014 | Zhao et al. ........................ 704/9 |
| 2003/0040900 | A1 * | 2/2003 | D'Agostini ....................... 704/2 |
| 2005/0071275 | A1 * | 3/2005 | Vainstein et al. ............... 705/51 |
| 2005/0071658 | A1 * | 3/2005 | Nath et al. ..................... 713/193 |
| 2005/0234707 | A1 * | 10/2005 | Luo et al. .......................... 704/9 |
| 2007/0010989 | A1 | 1/2007 | Faruquie et al. |
| 2007/0203690 | A1 * | 8/2007 | Wang et al. ....................... 704/2 |
| 2007/0294077 | A1 * | 12/2007 | Narayanan et al. ............... 704/2 |
| 2008/0154577 | A1 * | 6/2008 | Kim et al. ......................... 704/2 |

(Continued)

OTHER PUBLICATIONS

Fuji et al., Semi-automatic Acquisition Translation Knowledge from Parallel Corpora, 2002.

(Continued)

*Primary Examiner* — Martin Lerner
(74) *Attorney, Agent, or Firm* — Ryan, Mason & Lewis, LLP (57) ABSTRACT

A method, an apparatus and an article of manufacture for determining a dropped pronoun from a source language. The method includes collecting parallel sentences from a source and a target language, creating at least one word alignment between the parallel sentences in the source and the target language, mapping at least one pronoun from the target language sentence onto the source language sentence, computing at least one feature from the mapping, wherein the at least one feature is extracted from both the source language and the at least one pronoun projected from the target language, and using the at least one feature to train a classifier to predict position and spelling of at least one pronoun in the target language when the at least one pronoun is dropped in the source language.

23 Claims, 6 Drawing Sheets

(56) References Cited

U.S. PATENT DOCUMENTS

| | | | |
|---|---|---|---|
| 2008/0319735 A1* | 12/2008 | Kambhatla et al. | 704/9 |
| 2009/0106015 A1 | 4/2009 | Li et al. | |
| 2009/0112573 A1 | 4/2009 | He | |
| 2009/0299925 A1* | 12/2009 | Ramaswamy et al. | 706/12 |
| 2009/0326911 A1 | 12/2009 | Menezes et al. | |
| 2010/0057432 A1 | 3/2010 | Hua et al. | |
| 2010/0199088 A1* | 8/2010 | Nath et al. | 713/167 |
| 2010/0223049 A1 | 9/2010 | Menezes et al. | |
| 2012/0296633 A1* | 11/2012 | Chalabi et al. | 704/4 |
| 2012/0316862 A1* | 12/2012 | Sultan et al. | 704/4 |
| 2014/0163962 A1* | 6/2014 | Castelli et al. | 704/9 |

OTHER PUBLICATIONS

Brown et al., The Mathematics of Statistical Machine Translation: Parameter Estimation, Computational Linguistics, v. 19, n. 2, Jun. 1993.

Snover et al., A Study of Translation Edit Rate with Targeted Human Annotation, Proceedings of Association for Machine Translation in the Americas, 2006.

Papineni et al., BLEU: A Method for Automatic Evaluation of Machine Translation, in ACL-2002: 40th Annual Meeting of the Association for Computational Linguistics, pp. 311-318.

Zhao et al., Generalizing Local and Non-Local Word-Reordering Patterns for Syntax-Based Machine Translation, in EMNLP-2008, pp. 572-581.

Nocedal, Updating Quasi-Newton Matrices with Limited Storage, Mathematics of Computation 35: 773-782, (Jul. 1980).

Dienes et al., Antecedent Recovery: Experiments with a Trace Tagger, EMNLP 2003.

Chung et al., Effects of Empty Categories on Machine Translation, EMNLP 2010.

Cai et al., Language-Independent Parsing with Empty Elements, ACL 2011.

Marcus et al., Building a Large Annotated Corpus of English: the Penn Treebank, Computational Linguistics, 19:313-330, (1993).

Watanabe et al., Statistical Machine Translation Using Hierarchical Phrase Alignment, 2004.

Johnson et al., Structured, Universal Natural-Language Generator for Sophisticated Target-Language Generation in Machine Translation Systems, IP.com Disclosure No. IPCOM000058443D, Publication Date: Oct. 1, 1988.

Anderberg et al. High-Level Language Translation in Symbol 2R. Dec. 31, 1973.

Xue et al. The Penn Chinese TreeBank: Phrase Structure Annotation of a Large Corpus, Natural Language Engineering, 11(2):207-238, 2005.

Wikipedia, Government and Binding Theory, Jan. 12, 2012, http://en.wikipedia.org/w/index.php?title=Government_and_binding_theory&oldid=471034465.

* cited by examiner

PREDICTING PRONOUNS OF DROPPED PRONOUN STYLE LANGUAGES FOR NATURAL LANGUAGE TRANSLATION

STATEMENT OF GOVERNMENT RIGHTS

This invention was made with Government support under Contract No.: HR0011-08-C-0110 awarded by Defense Advanced Research Projects Agency (DARPA). The Government has certain rights in this invention.

FIELD OF THE INVENTION

Embodiments of the invention generally relate to information technology, and, more particularly, to translation technology.

BACKGROUND

Pronoun-dropping (or pro-drop) languages such as, for example, Chinese, Arabic and Romance languages such as Italian, are extremely important source languages in today's machine translation markets. A pronoun that acts as the subject of the sentence is explicit in English, but is implicit, or more frequently dropped, in pro-drop languages because it can be inferred from the context by native speakers.

A missing subject in the translation of pro-drop languages into English or into any non-pronoun-dropping languages will seriously hurt readability, and hence reduce the user acceptance and satisfaction for any translation products. In addition, pro-drop phenomena are also frequent in Twitter, Facebook, mobile style short-messages, and other informal style texts.

Existing approaches to the problem of recovering dropped pronouns are based on monolingual techniques, and fall under the broad category of restoring empty categories from the text. Empty categories are placeholders in parse tree that account for irregularities of languages. However, such approaches that rely on monolingual approaches to pronoun recovery suffer from poor performance.

SUMMARY

In one aspect of the present invention, techniques for predicting pronouns for pro-drop style languages for natural language translation are provided. An exemplary computer-implemented method for determining a dropped pronoun from a source language can include steps of collecting parallel sentences from a source and a target language, creating at least one word alignment between the parallel sentences in the source and the target language, mapping at least one pronoun from the target language sentence onto the source language sentence, computing at least one feature from the mapping, wherein the at least one feature is extracted from both the source language and the at least one pronoun projected from the target language, and using the at least one feature to train a classifier to predict position and spelling of at least one pronoun in the target language when the at least one pronoun is dropped in the source language.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes predicting pronouns for pro-drop style languages for natural language translation and understanding systems. At least one embodiment of the invention includes using information extracted from both source and target languages to drive a pronoun-recovery process. By way of example, an aspect of the invention includes extracting monolingual features from the source language sentences and target language sentences, as well as multilingual features from the source-target sentence pairs. Further, these extracted items are used as input to automated methods, such as statistical classifiers, to recover dropped pronouns. Accordingly, an aspect of the invention includes accurately predicting missing pronouns and automatically generating the same from the source sentence context.

Additionally, an embodiment of the invention also includes facilitating a non-expert user to control the pronoun-recovery process by way of an intuitive user interface that does not require knowledge of machine translation or of the underlying automatic algorithms used to recover the pronouns.

In at least one embodiment of the invention, there are no explicit phrase-pairs, as the techniques detailed herein include predicting the dropped pronouns in the target spelling directly from the whole source sentence context. As such, the "source" part is indeed not defined, and thus their phrase-pair scoring techniques are irrelevant. Embodiments of the invention emphasize modeling generating the dropped pronouns, which is not part of any decoding algorithms. Also, the output of the techniques described herein can be an input to any decoding or translation engines.

By way of illustration, translation is used as an example herein because it is one of the most difficult natural language processing (NLP) problems, and many other NLP processes can be formulated as a translation problem. For instance, recovering the missing pronouns for a monolingual language, such as English, is also a translation problem with the source language of English sentences in the social-media style, and the target language is the English sentences with restored missing pronouns.

If there is no scheme for inferring the dropped pronoun during automatic translation, the produced output in the destination language can be ungrammatical, hard to understand, or even misleading. Such translation output will significantly hurt the utility of the translation services or the downstream NLP components such as cross-lingual information retrieval, co-references, machine reading and so on. Accordingly, as described herein, aspects of the invention include providing a solution to such pro-drop phenomena, a user interface to turn-on the predictions for missing pronouns, and limited user-computer interaction for improving the translation quality.

In one aspect of the invention, training data is collected from bilingual human annotators. In such an embodiment, the source language is a pro-drop language such as Arabic, and the target language is a generic language such as English. The human annotators recover the missing pronouns from the source language sentences, for example, by marking the alignment of the pronouns in the target language to the positions where they were dropped in the source language. This can be accomplished, for example, where the annotator grouped a pronoun (such as "you") and its corresponding verb in the target language, and marked the alignment with the verb in a second position in the source language.

Another aspect of the invention includes pronoun recovery. Pronoun recovering is accomplished through the following steps. For each sentence in a training set, the pronouns in the target language are mapped onto source side trees according to the alignment links. This can be performed automatically or by hand. Features from the mapped pronouns, such as surrounding lexical n-grams, Part-of-speech (POS) tags, tree structures, morphology analysis, etc. are computed.

Feature computation is illustrated via the following example. For instance, assume the intention to extract features for the following Arabic sentence: المسؤولين القبض على عشرات من تسمونهم بالإرهابيين تعلنون عن

First, the text is segmented to separate affixes (including pronouns) from the white space delimited text, resulting in: على عشرات من تسمون +هم ب# الإرهابيين المسؤولين تعلنون عن القبض

The Romanized stream is as follows:

tElnwn En AlqbD ElY E$rAt mn tsmwn +hm b# Al<rhAbyyn Alms&wlyn

The sentence is translated into English as:

You announce the arrest of tens of what you call culprits responsible

Features are extracted from this text to predict whether the pronoun هم+ (+hm) is a nullsbj. Features can include the token itself (هم+), the token's part-of-speech (POS) tag IVSUFF, the two preceding tokens من تسمون (mn tsmwn—what you call) and their corresponding POS tags REL IV, the following two tokens (ب# الإرهابيين) and their POS tags PREP ADJ, etc.

The computed/extracted features are used to train a sequential classifier such as, for example, a tree-relabeling, a conditional random field, or a maxent classifier. The classifier is trained to produce the likelihood of the existence of pronouns in the target language, such as "he/she/me/him/I/they/them/it/null/we/our/ his/her/its/" in English.

Additionally, the trained classifier is used on the source text to be translated to predict the likelihood that specific pronouns were dropped in the source language. That likelihood is converted into a cost, and a new Context-Free-Grammar (CFG) rule "[X]→[X,Pronoun] [X]|cost" is created, where [X,Pronoun] is one of the candidate pronouns, and [X] is a non-terminal in general, in the CFG rule. This CFG rule is applied during the initialization of a chart-based decoder, and the bottom-up decoding is run to generate a machine translation output.

Accordingly, the above steps teach how to annotate the data, how to convert the data into features, how to train a classifier that predicts dropped pronouns, how to use the classifier to predict dropped pronouns, how to convert the prediction of the classifier into a rule that can be used by a translation engine, and how a translation engine can use the constructed rule.

Additionally, at least one embodiment of the invention can be implemented and used in a system, such as described in FIG. 1 through FIG. 5.

Figure 1:
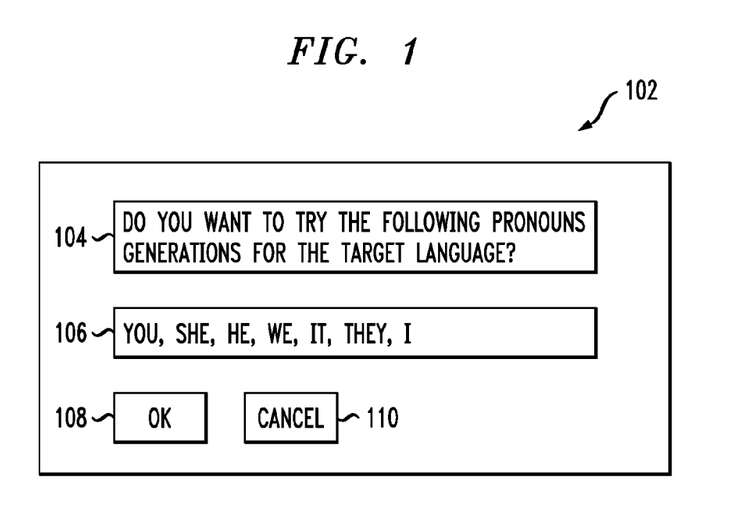
FIG. 1 is a diagram illustrating an example interface for soliciting an end-user's preference to improve the translation quality, according to an embodiment of the present invention.

FIG. 1 is a diagram illustrating an example interface 102 for soliciting an end-user's preference to improve the translation quality, according to an embodiment of the present invention. By way of illustration, FIG. 1 depicts a query 104 that prompts the user if he/she wants to try the following pronouns generations for the target language. This step is conservative, and restricted to only several common pronouns in the target language. In this case, the prompt 106 includes "You, She, He, We, It, They, and I." The user click "OK" via component 108 to configure the system to generate these pronouns only, or "Cancel" via component 110.

Figure 2:
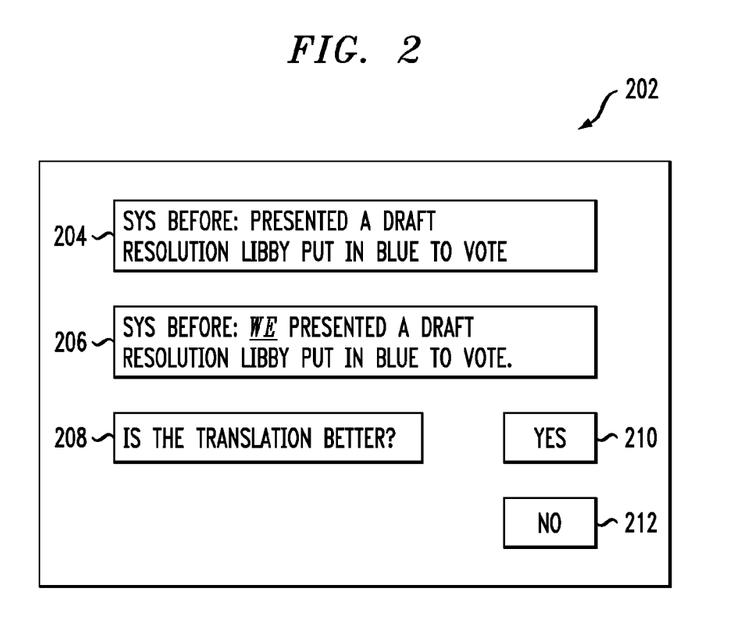
FIG. 2 is a diagram illustrating an example interface for displaying the translation resulting from the user selection, according to an embodiment of the present invention.

FIG. 2 is a diagram illustrating an example interface 202 for displaying the translation resulting from the user selection, according to an embodiment of the present invention. By way of illustration, FIG. 2 depicts a displayed item 204 that indicates the system translation prior to insertion of the pronoun, while displayed item 206 indicates the system translation after insertion of the pronoun. Additionally, prompts 208, 210 and 212 are included to confirm if the end user wants to have the pronoun predictions step in his/her translation outputs.

Figure 3:
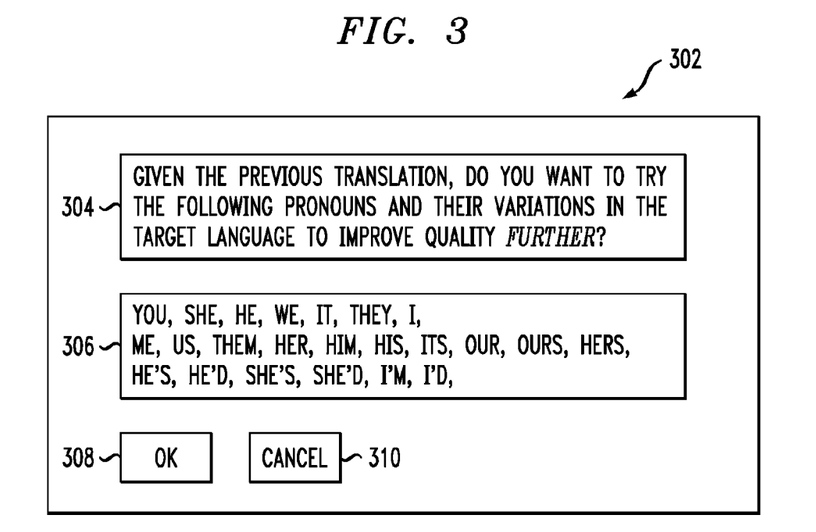
FIG. 3 is a diagram illustrating an example interface to generate a more comprehensive pronoun list, according to an embodiment of the present invention.

FIG. 3 is a diagram illustrating an example interface 302 to generate a more comprehensive pronoun list, according to an embodiment of the present invention. This interface is generated/popped-up only after the user confirms that a previous step (such as illustrated in FIG. 1) generates better translations. By, way of illustration, FIG. 3 depicts a query 304 that prompts the user that given the previous translations, if he/she wants to try the following (additionally) pronouns (identified in displayed component 306) and their variations in the target language to improve quality further. Prompts 308 and 310 enable the user to accept or cancel the prompt.

Figure 4:
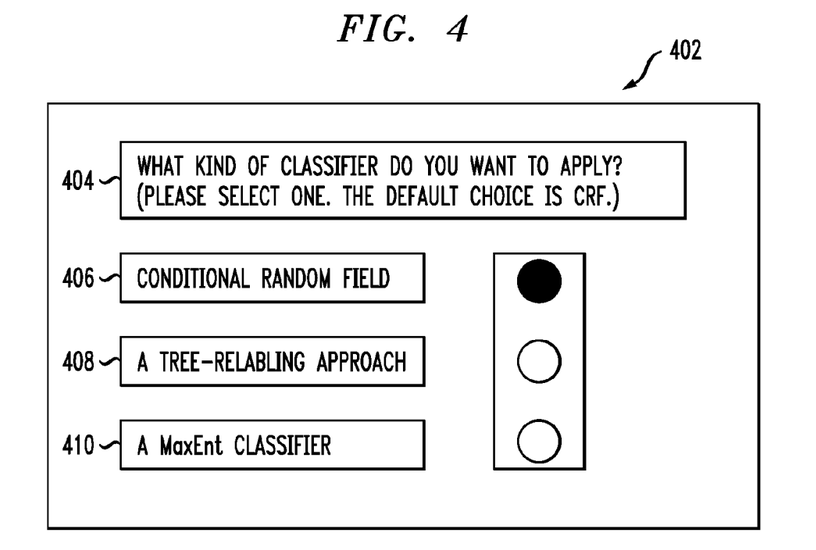
FIG. 4 is a diagram illustrating an example interface illustrating the classifiers' choices, according to an embodiment of the present invention.

FIG. 4 is a diagram illustrating an example interface 402 illustrating the classifier choices, according to an embodiment of the present invention. By way of illustration, FIG. 4 depicts a query 404 asking the user what kind of classifier he/she wants to apply, with the default selection being conditional random field (CRF). However, if the user wants to configure the generation differently, she/he is allowed to choose one of the pre-trained classifiers to configure the process further. In the FIG. 4 example, the pre-trained classifiers include conditional random field 406, a tree-enabling approach 408 and a MaxEnt classifier 410.

Figure 5:
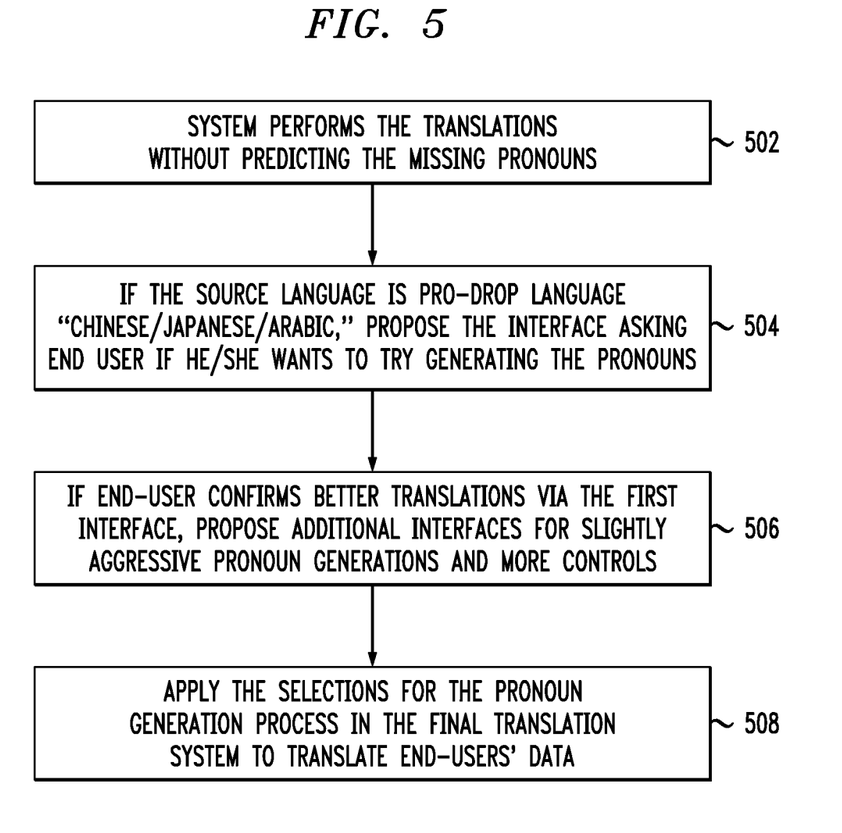
FIG. 5 is a diagram illustrating an example software flowchart of interactions between human and computer, according to an embodiment of the present invention.

FIG. 5 is a diagram illustrating an example software flowchart of interactions between human and computer, according to an embodiment of the present invention. In step 502, users are (optionally) provided with a graphical interface such as the one depicted in FIG. 1 to restrict the set of pronouns for which the system is trained. In response to the user input, the system proposes variations on the specified pronouns. For example, "he, she, we, I, me, you, his, her, our, ours, it, its, they, them, theirs, their, and NULL" can be used. NULL here means that there is no pronoun needed given the context.

In step 504, if the source language is pro-drop language "Chinese/Japanese/Arabic," the system proposes (via the interface querying the end user) if he/she wants to try generating the pronouns. Also, the user interface (UI) optionally contains a widget for advanced users that allow the user to choose one of the methods provided with the translation software, such as, for example, a tree-relabeling approach, conditional random field (CRF), or a MaxEnt (maximum entropy) classifier. FIG. 4 depicts the user makes a selection for one of the listed approach (for example, using a radio button widget).

In step 506, if the end-user confirms a better translation via the first interface, the system proposes additional interfaces for slightly aggressive pronoun generations and more controls. Additionally, the system can use the specified configurations to guide its translation of a limited amount of text, and generate the pronouns in the translation outputs obtained without and with the user configuration. The translated text is shown with pronouns, for example, as depicted in FIG. 2 and FIG. 3.

In step 508, the selections for the pronoun generation process are applied in the final translation to translate end-users' data. Additionally, in one embodiment of the invention, after inspecting the results with and without the configuration choices, the user then decides whether to apply the selected configuration to the whole set of documents to be translated, or to further refine the configuration choices, using the controls shown in FIGS. 2, 3, and 4.

Figure 6:
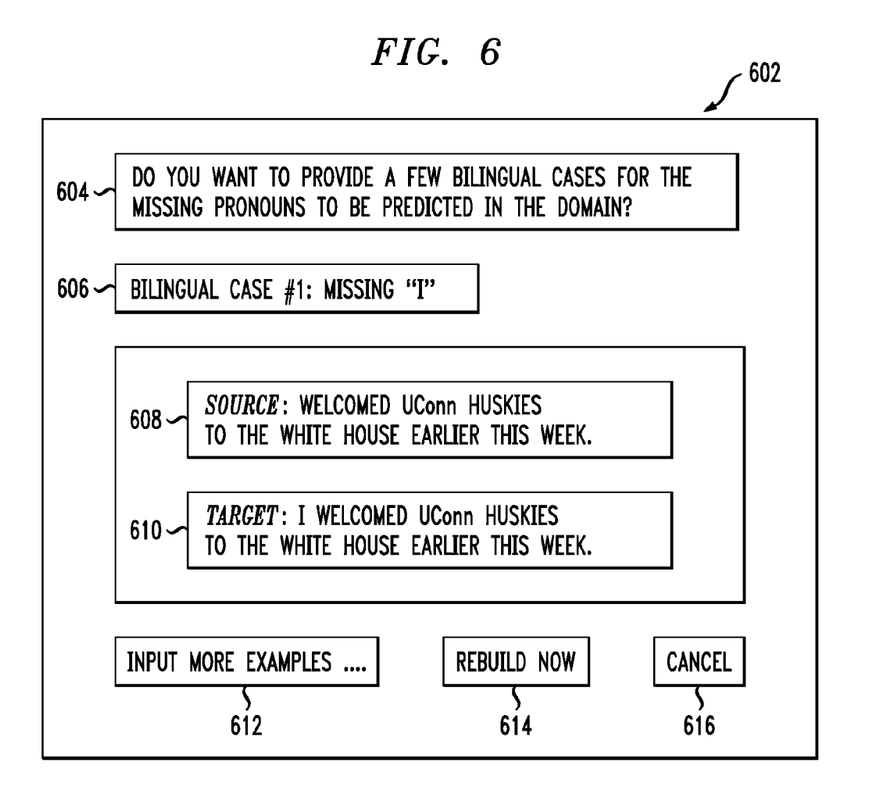
FIG. 6 is a diagram illustrating an example interface for users to input bilingual cases, and to configure and improve domain-specific classifiers' performances for pronouns of interests, according to an embodiment of the present invention.

FIG. 6 is a diagram illustrating an example interface 602 for users to input bilingual cases, and to configure and improve domain-specific classifiers' performances for pronouns of interest, according to an embodiment of the present invention. By way of illustration, FIG. 6 depicts a prompt 604 querying the user if he/she wants to provide one or more bilingual cases for the missing pronouns to be predicted in the domain. In such a situation indicating a missing pronoun in a bilingual case 606, the inputs from the user will need to include both the source sentence 608, and the target 610 which includes the missing pronouns. In the example depicted in FIG. 6, this is illustrated using a source and target that are both in English. The buttons on the bottom—612, 614 and 616—allow the user to input more data, execute the re-building of the classifiers, or cancel the process.

Additionally, at least one embodiment of the invention can be used in a trilingual/multilingual translation scenario. Suppose, for example, that there are two independent corpora, Chinese-English and Italian-English. The English corpus may or may not overlap in the two corpora; if there is no overlap, there are no parallel translations in the Chinese-Italian case. Even in this situation, an embodiment of the invention can be extended to learn how to recover those pronouns that are appropriate when translating between Chinese and Italian and vice-versa.

By way of illustration, given these two corpora in this example, an embodiment of the invention includes building two sets of classifiers: one labeling the Chinese, and one labeling Italian with English spelling of the pro-drops and their positions in the Chinese and Italian sentences, respectively. Given a third parallel corpora, Italian-Chinese, for which there is no explicit annotation of when to recover dropped pronouns, the techniques detailed herein use two classifiers to enrich the markups for both Italian and Chinese sides, and let the alignment (automatic) determine the pro-drop and their translations automatically. Accordingly, there is no need for a specific human-annotated Chinese-Italian input to build the classifier directly.

An additional aspect of the invention includes storing rules learned from the training data separately from the rules of a standard translation engine, for example, a chart decoder. Also, a subset of the rules learned from the training data can be added to the rules of the standard translation engine based on the configuration selections provided by the user (as detailed herein). This results in a dynamically configured translation engine. Further, the dynamically configured translation engine and the standard translation engine can be run to produce the results displayed to the user.

Another embodiment of the invention can include implementation and application to recover dropped pronouns in non-grammatical lingo and/or informal speak such as the web-parlance used in instant messaging, Tweets, and Facebook posts. In such an embodiment, the system treats the problem of recovering dropped pronouns in web parlance as a translation problem.

In the specific domains listed above, a commonly missing pronoun is "I." If a classifier is trained to recover dropped pronouns in a generic domain, it might have lower performance on a Facebook-style domain than a classifier trained for this domain. Accordingly, an embodiment of the invention includes reducing the risk of poor performance by exposing to the user appropriate mechanisms to control or configure the classifier. For example, the user can drive domain-adaptation by providing examples of sentence pairs that are typical of the domain of interest.

By way of illustration, a user can be provided with translation results using the described techniques. The user can specify what pronouns were good enough/satisfactory for his/her domains of interest. For instance, for Facebook style message, the pronoun of "I" may be satisfactory for improving the translation quality. Additionally, the user inputs text (for example, a few sentences) and the corresponding translations (source and target sentences together, required as bilingual cases) as learning examples for the system, which then runs automatic parsing on both the source and target, and maps the target side features to the source. The system then filters/sub-samples the training data from pre-stored/annotated data (for example, shipped together with the software, or accessed via online download pointer), which only contained the pronouns to the users' interests.

An embodiment of the invention can also perform re-training of the classifiers which can only predict the pronouns the users specified for the domain with the training data from pre-stored/annotated, together (optionally) with users' newly input data. Further, the configuration can be executed for the rest of the user's data in the domains of the interest.

Figure 7:
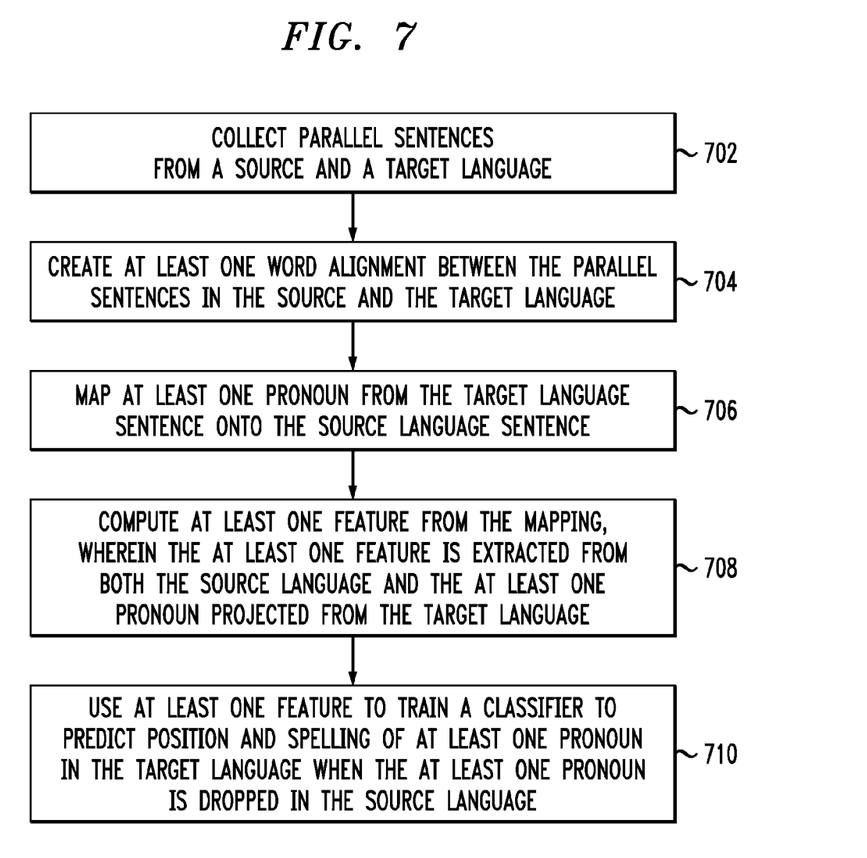
FIG. 7 is a flow diagram illustrating techniques for determining a dropped pronoun from a source language, according to an embodiment of the invention.

FIG. 7 is a flow diagram illustrating techniques for determining a dropped pronoun from a source language, according to an embodiment of the present invention. Step 702 includes collecting parallel sentences from a source and a target language. Step 704 includes creating at least one word alignment between the parallel sentences in the source and the target language. The word alignment between the parallel sentences in the source and the target language can be automatically created. Creating at least one word alignment between the parallel sentences in the source and the target language can include a human annotator marking which source word is aligned to which target word, or via the use of a computer program to generate the word alignment automatically.

Step 706 includes mapping at least one pronoun from the target language sentence onto the source language sentence. Step 708 includes computing at least one feature from the mapping, wherein the at least one feature is extracted from both the source language and the at least one pronoun projected from the target language. Features can include a sentence token, a sentence token's part-of-speech tag, at least one preceding sentence tokens and their corresponding part-of-speech tags, at least one subsequent sentence tokens and their corresponding part-of-speech tags, etc.

Step 710 includes using the at least one feature to train a classifier to predict position and spelling of at least one pronoun in the target language when the at least one pronoun is dropped in the source language. Using the at least one feature to train a classifier includes using the mapped feature in conjunction with at least one source language feature and at least one target language feature. This can include producing an initial translation for the source sentence into the target language, computing at least one feature from the initial translation, and using the at least one feature as input to the classifier together with the at least one mapped feature (and potentially all the other features computed from the source language).

The techniques depicted in FIG. 7 can additionally include creating a parse tree for each sentence in the source and target language. The parse tree is automatically created for the source language sentence and the target language sentence. An aspect of the invention can also include training a machine translation model with the input of the at least one mapped feature. Such an embodiment of the invention can further include enabling a user to submit text in the source language to the trained machine-translation model, and displaying to the user the translation of the submitted text in the source language, wherein the translation is produced by the trained machine translation model.

Also, the techniques depicted in FIG. 7 can include enabling a user to submit bi-lingual data for dynamically changing the classifier that determines position and spelling of at least one pronoun. This data can be collected from the user's feedback. Examples can include: (1) The end-users can retranslate the sentences, and submit the new translations; and (2) The end-users can mark the incorrect part of the translations, and submit the markups. An aspect of the invention can additionally include performing machine translation from a first language to a second language given a first language to third language corpus and a second language to third language corpus. Performing machine translation from a first language to a second language includes, given the two corpora, building two sets of classifiers, one classifier labeling the first language and one classifier labeling the second language with the third language spelling of at least one pronoun drop and its corresponding sentence position. Also, such an embodiment of the invention can include using the two classifiers to enrich a markup for both the second and first language, and using an alignment to determine the at least one pronoun drop and its translation automatically.

The techniques depicted in FIG. 7 can further include applying the classifier to translate informal speak (for example, from, Twitter, Facebook or text messaging) into formal English text (that is, translating chat-style sentences into well defined subject-verb-object (SVO) structures). Also, an aspect of the invention includes using the at least one feature to test the trained classifier.

The techniques depicted in FIG. 7 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 8:
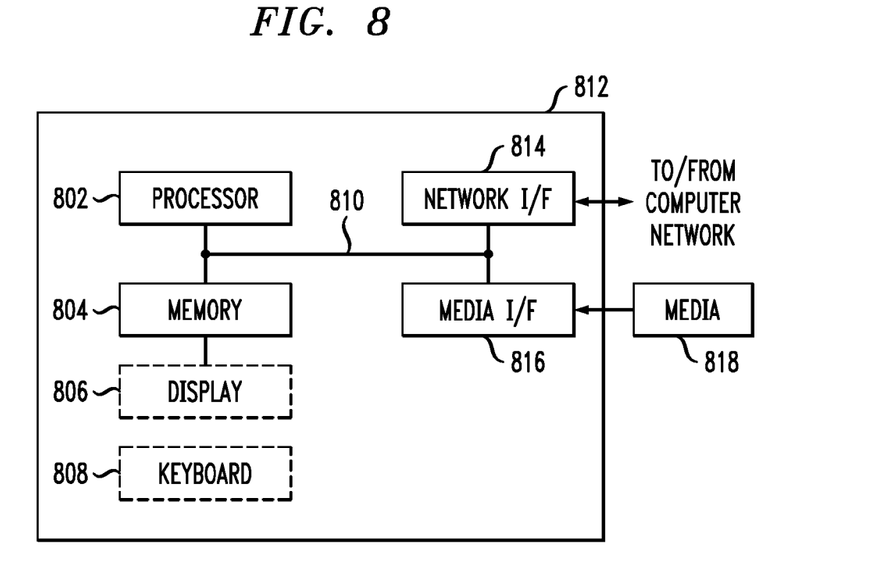
FIG. 8 is a system diagram of an exemplary computer system on which at least one embodiment of the invention can be implemented.

Additionally, an aspect of the present invention can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components depicted herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, using information extracted from both source and target languages to drive a pronoun-recovery process.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining a dropped pronoun from a source language, wherein the method comprises:
    collecting parallel sentences from a source language and a target language;
    creating at least one word alignment between the parallel sentences in the source language and the target language;
    mapping at least one pronoun from the target language sentence onto the source language sentence;
    computing multiple features from the mapping, wherein the multiple features are extracted from both the source language and the at least one pronoun projected from the target language;
    using the multiple features to train a plurality of classifiers to predict position and spelling of at least one pronoun in the target language when the at least one pronoun is dropped in the source language;
    updating the plurality of classifiers based on user feedback provided in response to a prediction of position and spelling of at least one pronoun in the target language when the at least one pronoun is dropped in the source language;
    providing a graphical user interface to enable a user to select one of the plurality of classifiers to apply to a portion of the source language, wherein said plurality of classifiers are displayed to the user via the graphical user interface for selection and comprise (i) a conditional random field classifier, (ii) a tree-relabeling classifier, and (iii) a maximum entropy classifier;
    wherein each of said collecting, said, creating, said mapping, said computing, said using, said updating, and said providing is carried out by a computer device.

2. The method of claim 1, further comprising:
    creating a parse tree for each sentence in the source language and the target language.

3. The method of claim 2, wherein the parse tree is automatically created for the source language sentence and the target language sentence.

4. The method of claim 1, wherein using the multiple features to train the plurality of classifiers comprises using at least one mapped feature in conjunction with at least one source language feature and at least one target language feature, comprising:
- producing an initial translation for the source language sentence into the target language;
- computing multiple features from the initial translation; and
- using the multiple features as input to the plurality of classifiers together with the at least one mapped feature.

5. The method of claim 1, wherein the at least one word alignment between the parallel sentences in the source language and the target language is automatically created.

6. The method of claim 1, further comprising:
- training a machine translation model with the input of the at least one mapped feature.

7. The method of claim 6, further comprising:
- enabling a user to submit text in the source language to the trained machine-translation model.

8. The method of claim 7, further comprising:
- displaying to the user the translation of the submitted text in the source language, wherein the translation is produced by the trained machine translation model.

9. The method of claim 1, further comprising:
- performing machine translation from a first language to a second language given a first language to third language corpus and a second language to third language corpus.

10. The method of claim 9, wherein performing machine translation from a first language to a second language comprises given the two corpora, building two sets of classifiers, one classifier labeling the first language and one classifier labeling the second language with the third language spelling of at least one pronoun drop and its corresponding sentence position.

11. The method of claim 10, further comprising:
- using the two classifiers to enrich a markup for both the second language and the first language; and
- using an alignment to determine the at least one pronoun drop and its translation automatically.

12. The method of claim 1, further comprising:
- applying the selected classifier to translate informal speak into formal English text.

13. The method of claim 1, further comprising:
- using the at least one feature to test the trained plurality of classifiers.

14. An article of manufacture comprising a computer readable storage memory having computer readable instructions tangibly embodied thereon which, when implemented, cause a computer to carry out a plurality of method steps comprising:
- collecting parallel sentences from a source language and a target language;
- creating at least one word alignment between the parallel sentences in the source language and the target language;
- mapping at least one pronoun from the target language sentence onto the source language sentence;
- computing multiple features from the mapping, wherein the multiple features are extracted from both the source language and the at least one pronoun projected from the target language;
- using the multiple features to train a plurality of classifiers to predict position and spelling of at least one pronoun in the target language when the at least one pronoun is dropped in the source language;
- updating the plurality of classifiers based on user feedback provided in response to a prediction of position and spelling of at least one pronoun in the target language when the at least one pronoun is dropped in the source language; and
- providing a graphical user interface to enable a user to select one of the plurality of classifiers to apply to a portion of the source language, wherein said plurality of classifiers are displayed to the user via the graphical user interface for selection and comprise (i) a conditional random field classifier, (ii) a tree-relabeling classifier, and (iii) a maximum entropy classifier.

15. The article of manufacture of claim 14, wherein the computer readable instructions which, when implemented, further cause a computer to carry out a method step comprising:
- creating a parse tree for each sentence in the source language and the target language.

16. The article of manufacture of claim 14, wherein using the at least one feature to train the plurality of classifiers comprises using at least one mapped feature in conjunction with at least one source language feature and at least one target language feature, comprising:
- producing an initial translation for the source language sentence into the target language;
- computing multiple features from the initial translation; and
- using the multiple features as input to the plurality of classifiers together with the at least one mapped feature.

17. The article of manufacture of claim 14, wherein the computer readable instructions which, when implemented, further cause a computer to carry out a method step comprising:
- performing machine translation from a first language to a second language given a first language to third language corpus and a second language to third language corpus, wherein performing machine translation from a first language to a second language comprises given the two corpora, building two sets of classifiers, one classifier labeling the first language and one classifier labeling the second language with the third language spelling of at least one pronoun drop and its corresponding sentence position;
- using the two classifiers to enrich a markup for both the second language and the first language; and
- using an alignment to determine the at least one pronoun drop and its translation automatically.

18. The article of manufacture of claim 14, wherein the computer readable instructions which, when implemented, further cause a computer to carry out a method step comprising:
- applying the selected classifier to translate informal speak into formal English text.

19. A system for determining a dropped pronoun from a source language, comprising:
- at least one distinct software module, each distinct software module being embodied on a tangible computer-readable medium;
- a memory; and
- at least one processor coupled to the memory and operative for:
  - collecting parallel sentences from a source language and a target language;
  - creating at least one word alignment between the parallel sentences in the source language and the target language;
  - mapping at least one pronoun from the target language sentence onto the source language sentence;

computing multiple features from the mapping, wherein the multiple features are extracted from both the source language and the at least one pronoun projected from the target language;

using the multiple features to train a plurality of classifiers to predict position and spelling of at least one pronoun in the target language when the at least one pronoun is dropped in the source language;

updating the plurality of classifiers based on user feedback provided in response to a prediction of position and spelling of at least one pronoun in the target language when the at least one pronoun is dropped in the source language; and providing a graphical user interface to enable a user to select one of the plurality of classifiers to apply to a portion of the source language, wherein said plurality of classifiers are displayed to the user via the graphical user interface for selection and comprise (i) a conditional random field classifier, (ii) a tree-relabeling classifier, and (iii) a maximum entropy classifier.

20. The system of claim 19, wherein the at least one processor coupled to the memory is further operative for:

creating a parse tree for each sentence in the source language and the target language.

21. The system of claim 19, wherein the at least one processor coupled to the memory operative for using the at least one feature to train the plurality of classifiers is further operative for using at least one mapped feature in conjunction with at least one source language feature and at least one target language feature, comprising:

producing an initial translation for the source language sentence into the target language;

computing multiple features from the initial translation; and using the multiple features as input to the plurality of classifiers together with the at least one mapped feature.

22. The system of claim 19, wherein the at least one processor coupled to the memory is further operative for:

performing machine translation from a first language to a second language given a first language to third language corpus and a second language to third language corpus, wherein performing machine translation from a first language to a second language comprises given the two corpora, building two sets of classifiers, one classifier labeling the first language and one classifier labeling the second language with the third language spelling of at least one pronoun drop and its corresponding sentence position;

using the two classifiers to enrich a markup for both the second language and the first language; and using an alignment to determine the at least one pronoun drop and its translation automatically.

23. The system of claim 19, wherein the at least one processor coupled to the memory is further operative for:

applying the selected classifier to translate informal speak into formal English text.

* * * * *